UNITED STATES PATENT OFFICE.

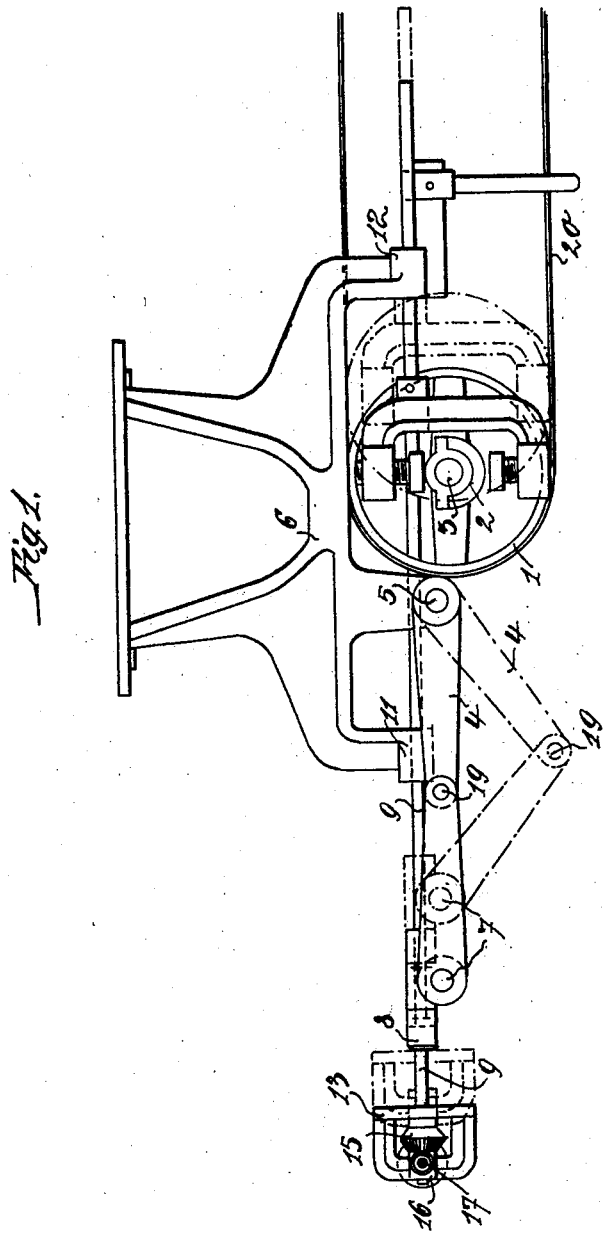

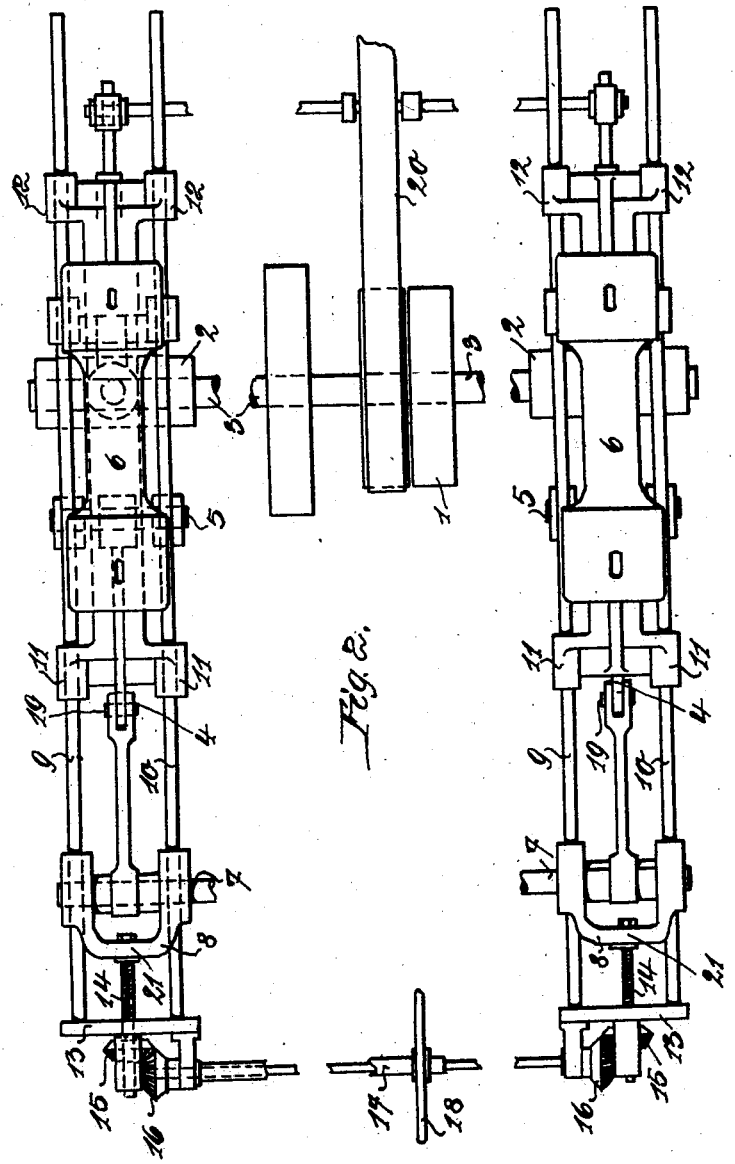

OSKAR LEINBROCK, OF GOTTLEUBA, GERMANY.

INTERMEDIATE BELT-GEARING.

1,394,100.

Specification of Letters Patent.  Patented Oct. 18, 1921.

Application filed June 12, 1920. Serial No. 388,694.

*To all whom it may concern:*

Be it known that I, OSKAR LEINBROCK, a citizen of the German Empire, and residing at Gottleuba, Germany, have invented certain new and useful Improvements in Intermediate Belt-Gearings, for which I have filed an application for patent in Germany on July 27, 1917, (L. 45481 XII, 47d,) of which the following is a specification.

The invention relates to an intermediate belt gearing having its intermediate shaft mounted in displaceable bearings for tightening and loosening the driving belt and consists in the provision of a toggle joint lever being bent outward in order to loosen the driving belt and being bent in opposite direction beyond its dead point in order to tighten the same. Hereby the displaceable bearings will be brought from one predetermined position to another, wherein the belt is loosened or perfectly tightened, whereby in the first instance the belt may recover its original length after each working period. The tightening as well as the loosening of the belt may be effected by one single manipulation which requires no special care and skill of the operator, so that the belts may be loosened after each working period which results in a perfect preservation of the belts.

With the heretofore used devices of this kind, no such perfect result could be obtained, most of them being provided with worm-wheels or rack-and-pinion devices adapted to displace the bearings of the intermediate shaft, so that after loosening the belt by said means the re-tightening at the beginning of the working period had to be effected in a most careful way, in order that the belt may be neither too loose nor too tight. These difficulties made the devices most impracticable for continual use, as the re-tightening of the belts demanded greatest exactness and carefulness. It is evident that in the present arrangement no such difficulties prevent the continual use so that not only the belts will be preserved any length of time but also losses of power are prevented.

In the accompanying drawings the invention is represented by way of example, and therein—

Figure 1 is a side-view,

Fig. 2 a view from above.

1, 1 are fast and loose pulleys, 2 the displaceable bearing of the intermediate shaft 3, and 4 is a toggle joint lever, which is mounted at the drop hanger frame 6 by means of the axle 5. The other end of the toggle joint lever 4 is connected to the axle 7. The axle 7 is fast connected with the arm 8. The arm 8 is again connected to the bearings 9 and 10 in such a manner as to be capable of sliding to and fro. These bearings 9 and 10 slide in bearings 11, 11 and 12, 12 of the drop hanger frame 6. The bearings 9 and 10 are fast connected with the axle 7 which is connected with the toggle joint lever 4 and the intermediate shaft 3. The arm 13 is fast connected to the bearings 9 and 10. A screw-spindle 14 passes the arm 13. The one end 21 of said screw spindle passes a bevel gear wheel 15 wherein it may rotate, said bevel gear wheel meshes with the bevel gear wheel 16. The bevel gear wheel 16 is connected with the bar 19 and the hand-lever 18. 19 is the point at which the toggle joint lever is acted upon, 20 is the driving belt.

The mode of operation is as follows:

The belt 20 is tensioned when positioned as shown in full lines in Fig. 1. If the same is to be slackened the toggle joint lever 4 must be drawn downward in seizing the same at the point 19 by means of a hook or the like. As the toggle joint lever 4 is fast connected to the axle 5 which latter is not displaceable, whereas the other end of the toggle joint lever is displaceable, the shaft 7 will be drawn in forward direction. Hereby the intermediate shaft 3, the bearing 2 and the pulley 1 are displaced as well, as all these are fast connected with the bearings 9 and 10, whereas these last named bearings are again fast connected with the lever 7. Consequently the belt will be untensioned hereby as is shown in dotted lines in Fig. 1. If now the belt is to be tightened again the toggle joint lever 4 is bent through beyond the dead point of the same and the arm 8, the axle 7, the bearing 2 and the pulley 1 pass from the position shown in dotted lines in Fig. 1 into the position shown in full lines.

I claim:—

1. In an intermediate belt gearing having its intermediate shaft mounted in displaceable bearings for tightening and loosening the driving belt, a fast and loose pulley, a driving belt, bearings, an intermediate shaft, adapted to slide in said bearings, a toggle joint lever, means for connecting the same to said bearings, means for interconnecting said bearings, said intermediate shaft and said pulley in such a manner that the movement of the toggle-joint-lever in downward direction results in a respective movement of the said bearing, said shaft and said pulley, and thereby in a loosening of the driving belt, whereas a movement of the toggle-joint-lever in opposite direction which will be as well transmitted to the said bearing, said intermediate shaft and said pulley results in a re-tightening of the belt.

2. In an intermediate belt gearing having its intermediate shaft mounted in displaceable bearings for tightening and loosening the driving belt, a fast and loose pulley, a driving belt, bearings, an intermediate shaft adapted to slide in said bearings, a drop hanger frame bearing at said drop hanger frame, said toggle-joint-lever being mounted at said drop hanger frame by means of an axle, an arm, bars, being adapted to slide in said bearings of said drop hanger frame, said bars being connected to said arms, said arm being connected to said axle and thereby to said toggle-joint-lever and said intermediate shaft, so that each movement of the toggle-joint-lever results in a respective loosening or re-tightening of the driving belt within predetermined limits, substantially as described.

In testimony whereof I affix my signature in presence of two witnesses.

OSKAR LEINBROCK.

Witnesses:
 Dr. Gandes Rovener,
 E. Heyden.